(12) United States Patent
Thellier et al.

(10) Patent No.: US 9,096,456 B2
(45) Date of Patent: Aug. 4, 2015

(54) CELLULAR BENDING MOLD

(75) Inventors: Herve Thellier, Pimprez (FR);
Christophe Machura, Chevincourt (FR); Robert Lagneaux, Attichy (FR); Romain Thepot, Gien (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 135 days.

(21) Appl. No.: 13/695,569

(22) PCT Filed: May 18, 2011

(86) PCT No.: PCT/FR2011/051121
§ 371 (c)(1),
(2), (4) Date: Oct. 31, 2012

(87) PCT Pub. No.: WO2011/144865
PCT Pub. Date: Nov. 24, 2011

(65) Prior Publication Data
US 2013/0042650 A1    Feb. 21, 2013

(30) Foreign Application Priority Data

May 19, 2010    (FR) ..................................... 10 53859

(51) Int. Cl.
*C03B 23/03*    (2006.01)
*C03B 23/035*   (2006.01)
*C03B 40/00*    (2006.01)

(52) U.S. Cl.
CPC ........... *C03B 40/005* (2013.01); *C03B 23/0302* (2013.01); *C03B 23/0352* (2013.01); *Y10T 29/49826* (2015.01)

(58) Field of Classification Search
CPC .............. C03B 23/0302; C03B 23/035; C03B 23/0352; C03B 23/0355; C03B 23/0357
See application file for complete search history.

(56) References Cited

U.S. PATENT DOCUMENTS

| | | | |
|---|---|---|---|
| 2,395,727 | A | 2/1946 | Devol |
| 3,457,055 | A | 7/1969 | Brewin |
| 3,756,797 | A | 9/1973 | Akeyoshi et al. |

(Continued)

FOREIGN PATENT DOCUMENTS

| | | |
|---|---|---|
| DE | 75 37 280 | 3/1977 |
| DE | 39 08 642 | 3/1990 |

(Continued)

OTHER PUBLICATIONS

French Search Report Issued Nov. 19, 2010 in Application No. FR 1053859 Filed May 19, 2010 (with translation of category).

(Continued)

*Primary Examiner* — Joseph S Del Sole
*Assistant Examiner* — Cynthia Szewczyk
(74) *Attorney, Agent, or Firm* — Oblon, Spivak, McClelland, Maier & Neustadt, L.L.P.

(57) ABSTRACT

A mold for bending glass, including a cellular solid material including cells that form cavities in the molding area, the cells representing more than 40% of the volume of the material. A low-heat-capacity tool bends glass panes in the context of processing tempered or laminated glass. A process for manufacturing the bending mold includes assembly of metal sheets of different shapes placed parallel to one another so as to form a cellular unit, then machining of the molding area of the unit, the area being placed substantially perpendicular to the metal sheets.

34 Claims, 4 Drawing Sheets

(56) References Cited

U.S. PATENT DOCUMENTS

| | | | |
|---|---|---|---|
| 4,501,603 A | 2/1985 | Frank et al. | |
| 4,690,319 A | 9/1987 | Smith et al. | |
| 4,906,271 A | 3/1990 | D'Iribarne et al. | |
| 5,002,599 A * | 3/1991 | McMaster et al. | 65/182.2 |
| 5,069,703 A | 12/1991 | D'Iribarne et al. | |
| 5,079,931 A | 1/1992 | Lehto et al. | |
| 5,259,859 A | 11/1993 | Claassen et al. | |
| 5,383,947 A | 1/1995 | Montonen | |
| 5,651,806 A | 7/1997 | Moulding et al. | |
| 5,906,667 A * | 5/1999 | Moulding et al. | 65/287 |
| 6,318,125 B1 | 11/2001 | Diederen et al. | |

FOREIGN PATENT DOCUMENTS

| | | |
|---|---|---|
| EP | 0 451 469 | 10/1991 |
| EP | 0 571 824 | 12/1993 |
| JP | 1 126234 | 5/1989 |
| JP | 8 157226 | 6/1996 |
| JP | 2005 263585 | 9/2005 |

OTHER PUBLICATIONS

International Search Report Issued Sep. 29, 2011 in PCT/FR11/051121 Filed May 18, 2011.

* cited by examiner

CELLULAR BENDING MOLD

TECHNICAL FIELD

The invention relates to a low-heat-capacity tool for bending glass panes in the context of processing tempered or laminated glass. The tool according to the invention may be used to bend individual glass panes, or a number of superposed glass panes, generally two.

BACKGROUND

Many bending processes are known, such as gravity bending, suction bending, press bending and bending between roller conveyors. Bending tools are always in contact to a greater or lesser extent with the glass to be bent, which generally leads to heat exchange. This is because the bending tool never has exactly the same temperature as the glass. Depending on the circumstances, this heat exchange may cause at least one of the following problems:
- the glass may be cooled by the bending tool in locations where a deep bend is required, thereby causing local optical distortions and even breakages;
- the temperature of the bending tool may vary with time (under the effect of repeated contact with glass panes that are at a different temperature), thereby making adjustment difficult and resulting in nonuniform batches; and
- heat exchange must be compensated for by supplying additional heat, which costs money (additional hardware is required and energy consumption is increased).

These problems may occur in bending processes in which the tools are contained in furnaces, or in bending processes in which the tools are not contained in furnaces.

The invention solves the aforementioned problems. The inventors now had the idea of manufacturing and using, for the bending, a tool with a very low density, so as to reduce its heat capacity and its thermal conductivity and make it more thermally neutral with respect to the glass to be bent. This low density is achieved by way of cells. The term "cell" is understood to mean a cavity in a solid material and this term is equivalent to pocket, orifice, void or free space. The cell is evacuated, or filled with a gas at atmospheric pressure or at a pressure lower or higher than atmospheric pressure. This gas is generally air. The cells open onto the molding area of the mold, proportionally reducing the area of real contact. Heat exchange between the mold and the glass is thereby greatly reduced.

US 2007/157671 teaches a bending process that uses a full mold, the interior of the full mold possibly being compartmentalized in order to apply suction or blowing through its molding area. By way of other documents describing bending using full molds, mention may be made of US 2007/144211, U.S. Pat. No. 5,769,919, U.S. Pat. No. 5,669,952 and U.S. Pat. No. 3,778,244.

SUMMARY

The bending tool (or bending mold) according to the invention comprises a solid material and cells.

The nature of the solid material is chosen depending on the type of bending process used.

The bending mold according to the invention need not be contained in a furnace. If it is not placed in a furnace but is located in ambient air and if the bending applied to the glass panes is relatively shallow, the material may comprise an organic polymer optionally filled with fibers or particles, such as for example a heat-curable resin filled with glass fibers. For this type of bending it is of course possible to choose materials having higher thermal withstand capabilities, such as aluminum or stainless steel.

If the bending tool is not placed in a furnace but is located in ambient air, and if the bending applied to the glass panes is relatively deep, the material may be aluminum. For this type of bending, it is of course possible to choose materials having higher thermal withstand capabilities, such as stainless steel.

If the bending tool is placed in a furnace (the interior of which is generally at a temperature between 550 and 700° C.), the material may be stainless steel.

If required, the mold according to the invention may be cooled or heated depending on the bending process used. To cool or heat the tool, it is possible in particular to use the techniques described in US 2010/0050694.

Depending on the bending process used and on whether the mold is cooled or heated during use, the mold may have, in its steady operating state, a temperature lying between 50 and 700° C., the solid material being chosen depending on this temperature.

In any case, the glass pane itself is at a temperature lying between 580 and 650° C. when bent.

The solid material may be a metal such as stainless steel, for example 316 stainless steel. Stainless steel is inexpensive, easy to weld, easy to machine, withstands the bending temperatures, and is strong enough.

The bending mold comprises an assembly of metal sheets. The sheets may for example have a thickness within the range from 0.01 to 1 mm, especially from 0.02 to 0.6 mm. The thinner the sheets are, the greater the possible volume content of the cells of the mold. The assembly is noncompact. The term "noncompact" is understood to mean that the cells lie between various points where the sheets touch. By way of example, it is possible to use corrugated sheeting. This corrugated sheeting may be combined, within the assembly, with flat sheeting—as is the case for cardboard packaging. Corrugated sheeting may be manufactured by passing flat sheeting through a mechanism formed from toothed cylinders. The amplitude of the corrugation of the sheeting may be chosen to lie within the range from 1 to 40 mm, especially from 2 to 15 mm and even from 3 to 9 mm.

It is possible to use sheets that are thicker than 0.5 mm, possibly even having a thickness as great as 8 mm. Generally, this thicker sheet (or plate) is used in full bending molds, the cells of which are particularly large (cell area greater than 2 cm$^2$, especially between 2 and 40 cm$^2$), and for shallow bending and/or for bending relatively thick glass panes (i.e. 3 to 5 mm in thickness). These thick sheets (0.5 to 8 mm in thickness) may be flat and assembled as two orthogonal groups forming a grid in the molding area.

Depending on the circumstances, the sheeting may therefore have a thickness ranging from 0.01 to 8 mm.

The higher the temperature of the glass to be bent, the smaller the cross section of the cell in the molding area is chosen to be. This is because, if the cell cross section in the molding area is small it implies more solid material, per unit area, distributed in the molding area. Since the glass is softer at higher temperatures, this greater amount of solid material (or finer mesh) reduces marking of the glass. Likewise, the deeper the required bend in the glass, the smaller the cross section of the cell in the molding area is chosen to be. This is because deeper bends require higher pressing forces and a fine network of solid material in the molding area reduces the tendency for marking. A finer mesh of solid material in the molding area increases the number of points of contact leading to a better distribution of the bending pressure, i.e. the pressure applied by the bending mold on the glass. The means used to apply this pressure may be pneumatic or mechanical. The means is pneumatic if the pressure comes from suction applied through the cells of the mold according to the invention or by virtue of a skirt surrounding the mold according to the invention and providing suction around this mold, or if the pressure is applied by blowing air onto the glass so as to push it against the mold. The means is mechanical if a solid counter-mold presses the glass against the mold according to the invention. This counter-mold may be a ring mold so that it presses only the periphery of the glass, or it may be a full mold, i.e. it is applied not only to the periphery of the glass but also to the entire area of the glass and especially its central region.

The temperature of the glass during bending is low enough for the network of solid material (generally metal) surrounding the cells of the bending area to leave no marks on the glass. The glass therefore does not enter into the cells (or cavities) during the bending. The bending mold according to the invention is especially intended for the bending of glass panes having main faces each with a single concavity (a glass pane has two main faces), i.e. the concavity of a given main face does not change, i.e. each face is either everywhere concave or everywhere convex. In this case the molding area (and therefore each main face of the final curved pane) has a single concavity. The bending mold according to the invention may also be used to bend glass panes having main faces with a few changes in concavity, as is the case for S-shaped glazing. In this case, the shape of the glazing is for example such that any line drawn on one of its main faces sees at most 4, even at most 6 changes in concavity. In this case the molding area (and therefore each main face of the final curved pane) has at most 4, even at most 6 changes in concavity. If a line A drawn on the glass pane on one of its main surfaces has at least 2 inflection points P1 and P2 (an inflection point corresponding to a point where the changes in concavity), then the line B drawn on the bending mold according to the invention opposite the line A on the pane (the lines A and B have the same shape and are located on either side of the pane of glass) generally crosses at least ten cavities of the bending mold between the points P3 and P4 located, respectively, opposite points P1 and P2. It is in this context that it is possible to say that the molding area has at most six changes in concavity and preferably at most four changes in concavity and that each main face of the final curved glass pane has at most six changes in concavity and preferably at most four changes in concavity.

The mold for bending glass, according to the invention, comprises a cellular solid material the cells of which form cavities in the molding area, said cells representing more than 40% of the volume of the material.

This material is generally metal and may comprise a common metal, especially 316 stainless steel, as long as it has a porosity associated with it, forming the cells. The molding area is therefore heterogeneous: its rigidity is provided by the solid material but this solid material surrounds a multitude of cavities. This assembly of solid material and cavities forms the molding area. Thus the molding area consists of a continuous network of solid material surrounding spaces exempt from any condensed (solid or liquid) matter. The actual area of solid material of such a molding area is much smaller than if the area were made exclusively of a solid material, thereby proportionally reducing heat transfer between the glass to be bent and the mold. Thus, the actual area of solid material in the molding area may be less than 60% of the area of the molding area and even less than 30% of the area of the molding area. The rest of this area corresponds to cell cavities and is not filled with any condensed matter (no solid or liquid is found in the cells). It is preferable for the solid material to be quite well distributed over the area, forming a relatively fine network (or mesh) so as to avoid excessively large heterogeneities. In particular, cavities that are too wide run the risk of marking the glass. Thus, preferably, no circle of radius greater than 1 cm, and more preferably of radius greater than 0.5 cm, on the molding area of the cellular material should be exempt from solid material. The molding area is that which gives its shape to the glass, it being understood that generally a flexible fibrous material, called an interlayer, is fixed to this molding area so as to make contact with the glass. This fibrous material is made of refractory fibers (that withstand the bending temperatures) such as fibers made of refractory metal or ceramic. This fibrous material may be a nonwoven or woven, such as a felt, a woven or a knit. Its fibers may for example be made of 316 L or 347 stainless steel. They may for example have a diameter lying between 7 and 21 µm. This fibrous material is well known to a person skilled in the art. It lessens marking of the glass by the bending mold. It is very flexible and gas permeable. Its thickness is generally less than 3 mm and generally ranges from 0.3 to 1.5 mm. Thus, the invention also relates to a process for bending glass at its bending temperature with the mold according to the invention, a woven or a nonwoven comprising refractory fibers being, if required, in an intermediate position between the glass and the molding area.

The number of cavities per unit area in the molding area reflects the number of cells per unit volume in the interior of the mold. The cavities represent more than 40% of the molding area of the cellular material. If the cells represent more than 70% of the volume of the cellular material, the cavities represent more than 70% of the molding area of the cellular material. The molding area of the cellular material generally represents more than 70% and even more than 90% of the total molding area.

The solid material used in the molding area may be a metal and consist of an assembly of metal sheets. This assembly is noncompact so as to form the cells. This assembly results in, within the mold, a solid/void alternation, this alternation preferably forming the molding area. Thus, the molding area may comprise a multiplicity of metal-sheet edge faces.

To create these cells within a mold according to the invention made with metal, it is possible to combine metal sheets having different shapes provided that they cannot form a compact metal unit (without cells). In particular, the metal may comprise an alternation of corrugated sheets and flat sheets. It is also possible to stack corrugated sheets which however have different corrugations, provided that they do not fit into each other compactly. Preferably, the sheets used are welded (especially spot welded) or brazed to one another, or joined by any other means, thereby providing the mold with rigidity, in particular in its molding area. It is possible to envision using an adhesive to produce this join provided that the adhesive is compatible with the temperature of the mold in use.

The solid material may form a network, in the molding area, which surrounds cavities corresponding to the cells. The term "cavity" is understood to mean a region of the molding area corresponding to a cell and entirely surrounded with solid material. It is the intersection of a cell with the molding area. As mentioned above, this network of solid material must be sufficiently fine for the glass not to be marked. In particular, the molding area may be such that a circle of 10 cm radius lying in this molding area and centered on the center of said molding area contains at least 100 cavities. The center of the molding area is the point furthest from any edge of the mold.

If C is the center of the molding area and D is the smallest distance between C and the edge of the mold, there is not simultaneously:
- another point C' on the molding area; and
- a point P on the edge of the mold, such that the distance C'P is smaller than D.

The cells of the bending mold may have shapes that vary greatly depending on the form of the metal used. In particular, the cells may take the form of ducts that may or may not be rectilinear. These ducts pass through the bending mold in a direction substantially perpendicular to the molding area. The ducts may be tubular. The cells may take the form of rectilinear ducts when corrugated sheeting is used since if a corrugated sheet is juxtaposed with a flat sheet, each corrugation forms a rectilinear duct. The longitudinal direction of these ducts is parallel to the assembled sheets and is substantially orthogonal to the molding area (this orthogonality is of course not exact because the molding area is curved). It is possible to use these ducts to blow or suck a gas that acts on the glass through the bending mold. These ducts may be sealed laterally, i.e. they have only two openings, one on the molding face and the other on the side of the cellular material of the mold opposite the molding face. It is possible to make full use of these laterally sealed rectilinear ducts to create independent suction or blowing regions simply by partitioning (or compartmentalizing) that side of the bending mold opposite the molding area. This partitioning is associated with independent boxes, for providing suction or blowing, connected to the bending mold on the side opposite the molding area. Two, three or even more than three such boxes and regions may be provided. Such partitioning is mainly used for what are called "full" bending molds, it being understood that this adjective characterizes the extent of the molding area, which acts on most of the area of the glass and in particular on the central region, as opposed to a ring bending mold that acts only on the periphery of the glass pane. Thus the invention also relates to a device for bending glass panes comprising the bending mold according to the invention, the side opposite the molding area of the cellular solid material being compartmentalized in various regions, and an independent suction or blowing box being connected to each region in order that pressure may be applied to the cells having the form of ducts opening onto said region.

The bending mold according to the invention is a full mold. This is because the invention is very advantageous for full molds because the problem of heat exchange is particularly acute with this type of mold. To a person skilled in the art, a full mold (whether convex or concave or combining concave and convex regions) means unambiguously a mold that makes contact with most (at least 80% and even at least 90%) of the area of the glass, and in particular the central region of this glass. Bending skeletons and frames are not full molds since they are ring molds.

The invention also relates to the process for bending glass at its bending temperature with the mold according to the invention, an interlayer made of fibrous material generally clothing said mold. The process according to the invention may be such that suction or blow is applied through these cells. After bending, the curved glass may cool naturally or may be cooled more rapidly, it may even be tempered. The more the glass needs strengthening by tempering, the more it is heated during bending. The thermal inertia of the mold is decreased by decreasing the thickness of the sheets forming it because this makes it possible to increase the total volume of the cells. The hotter the glass needs to be, especially with regard to tempering, the greater the benefit of decreasing the cross section of the cells in the molding area.

The invention also relates to a process for manufacturing a bending mold according to the invention wherein metal sheets are assembled. According to one embodiment, the metal sheets have different shapes and are placed parallel to one another so as to form a cellular unit and then the molding area is machined from the unit, said area being placed substantially perpendicular to the metal sheets. Of course, when it is said that the sheets are placed parallel to one another it is just their general directions that are parallel. This is because, as they have different shapes, they cannot be parallel at every point on their surfaces. The process for manufacturing this mold comprises juxtaposing metal sheets of different shapes so as to create cells. The metal may comprise an alternating assembly of corrugated sheets and flat sheets. It is therefore possible to juxtapose in alternation a corrugated sheet and a flat sheet, then again a corrugated sheet and a flat sheet, etc. All these sheets are identically oriented and are therefore parallel. Thus a parallelepiped is formed. The sheets are then held firmly in place using a peripheral metal belt. Next a tinning material (melted in a oven) is poured along linear contact regions between the sheets so as to assemble them by brazing. This operation may be carried out in a vacuum oven away from oxygen. The brazed unit is then cut, for example by wire electrical discharge machining, grinding or sawing or any other machining means suitable for giving it its lateral outline (side of the bending mold substantially orthogonal to the molding area). Next, the unit is equipped with a metal belt, prepared separately, so as to cover the lateral sides of the unit. The molding area is then machined. This machining may be carried out using automatic 3- or 5-axis machines. In order to prevent the sheets from being flattened and to prevent the cells from becoming blocked or being filled by metal chips during the machining operation, preferably at least the cells opening onto the molding area are filled with resin. Preferably the resin is a hot-melt resin. It is preferably sufficiently rigid to prevent the sheets from being flattened during the machining. This filling is carried out by way of hot-dipping in the liquid hot-melt resin, followed by cooling leading to solidification of the resin. Next, the molding area is machined without deforming the cells in the molding area. Sandblasting is then carried out to remove flash. Next, the mold is heated to melt the hot-melt resin and remove it from the mold. Resin residues may be burnt or evaporated off by heating in a furnace. Use of thermosetting resin instead of hot-melt resin is not ruled out but its removal is difficult and costs more. It would be possible to burn off a thermosetting resin.

Instead of manufacturing the mold using the process described above, it is also possible to start by cutting sheets individually one after the other, or two by two, a metal belt having the shape suited to the final mold then being used to grip these cut sheets, said belt holding the sheets in place via the lateral edges of the mold. The assembly is then tinned and machined as described in the preceding process.

According to another embodiment, it is possible to construct a bending mold by assembling comb-shaped flat sheets comprising notches. This process comprises the assembly of flat metal sheets, each sheet having a comb shape comprising notches that are parallel to one another and cut from the same edge of said sheet, the sheets being split into two groups of sheets, the sheets of each group being parallel to one another, the sheets of one group being perpendicular to the sheets of the other group, the notches of each group of sheets being filled by the sheets of the other group. The two groups of sheets then form a grid in the molding area, i.e. a multiplicity of quadrilaterals form the cavities of the cellular mold according to the invention. It is possible to apply a pneumatic (blowing or suction) force through these cavities.

The mold according to the invention may be used to mold a glass pane or a number of superposed glass panes (generally two). The curved panes may then be tempered or assembled into a laminated glazing unit, especially to form an automotive glazing pane, for a side door or windshield, even for a rearview mirror.

DETAILED DESCRIPTION

Figure 1:
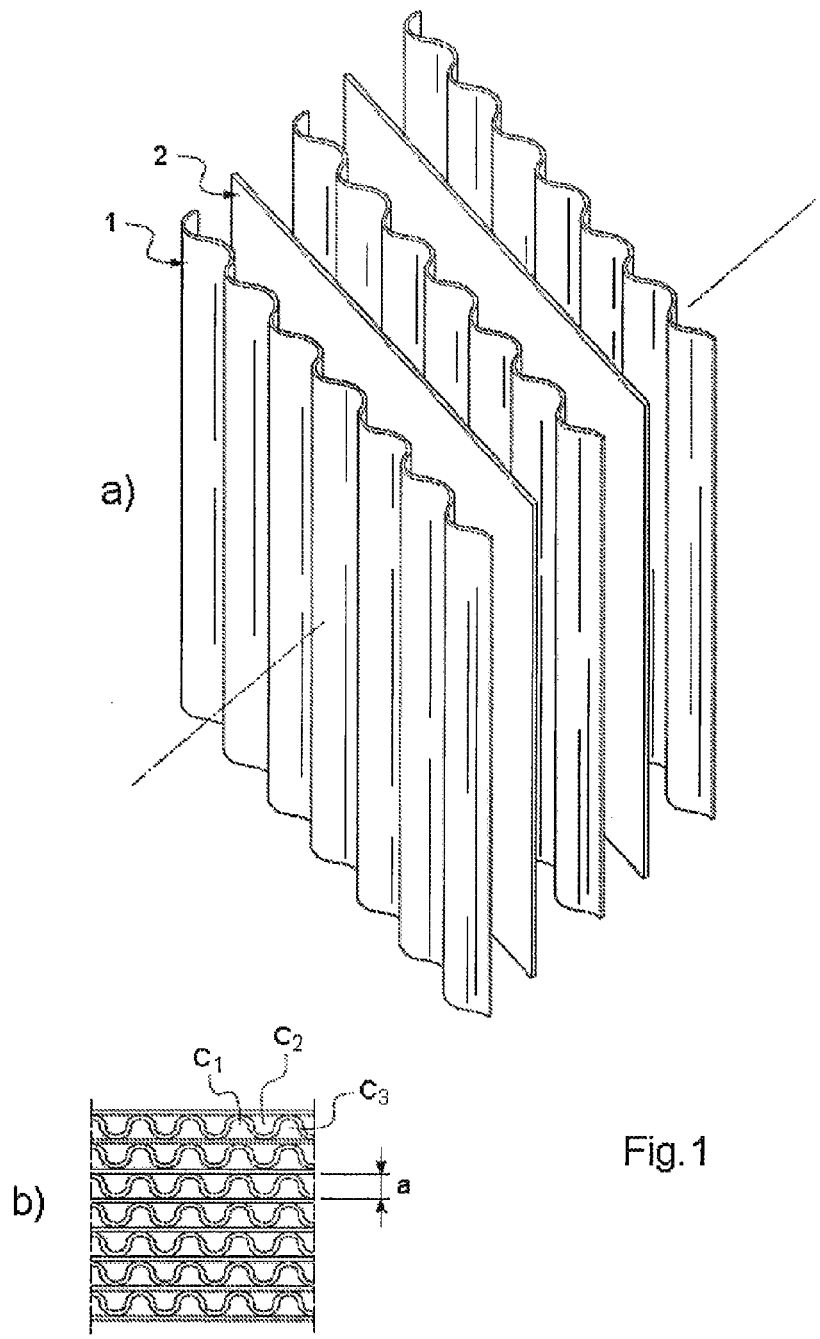
FIG. 1 illustrates an embodiment of a bending mold.

FIG. 1 illustrates how a bending tool according to the invention may be produced by assembling metal sheets having different shapes. In FIG. 1a, corrugated sheets 1 and flat sheets 2 have been alternated. These differently shaped sheets have general directions that are parallel. The corrugated sheet has an amplitude (a) of 5 mm. The two types of sheets have a thickness of 0.4 mm. They are then juxtaposed and brazed so as to form a unit. An area as shown in FIG. 1b is thus obtained. This area must still be given the shape desired for the bending mold. This area comprises a metal network formed by the edge faces of the sheets in the molding area, said network surrounding a multiplicity of cavities $c_1$, $c_2$, $c_3$, etc. which form just as many spaces exempt from any condensed matter. In this structure, cells pass right through the bending mold from the molding area as far as the bottom of the mold. It would be possible to produce a substantially equivalent structure by bonding profiled metal elements such as metal tubes to each other. When tubes are used, some of the cavities will then be circular. This area may be covered with an intermediate, thin fabric or felt, as is well known to a person skilled in the art, making contact with the glass to be bent.

Figure 2:
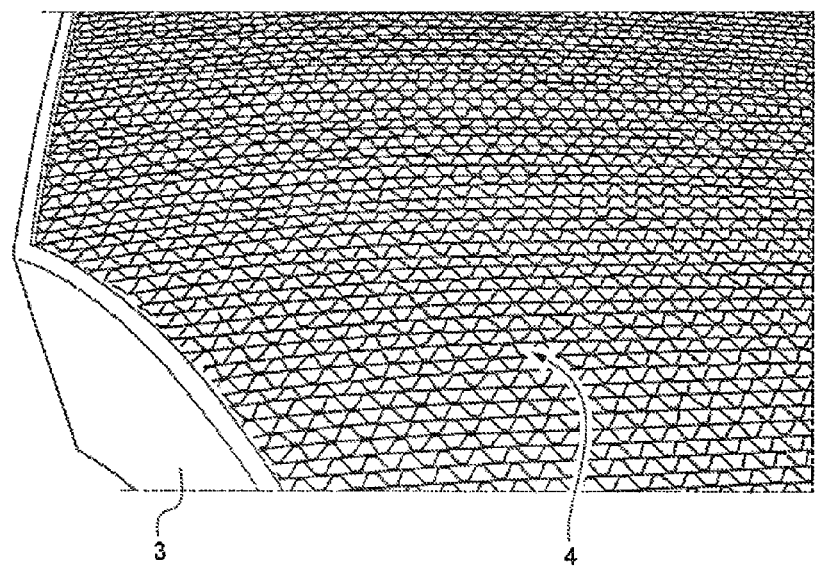
FIG. 2 shows a partial view of a full bending mold.

FIG. 2 shows a partial view of a full bending mold according to the invention. The assembly 4, made of alternating corrugated and flat sheets forming tubular cells, may be seen. This assembly is surrounded by a metal belt 3 that passes around the lateral edges of the mold. The edge face of this belt may make up some, at least partially, of the total molding area. Here the total molding area comprises the molding area of the cellular material in addition to the molding area of the edge face of the metal belt.

Figure 3:
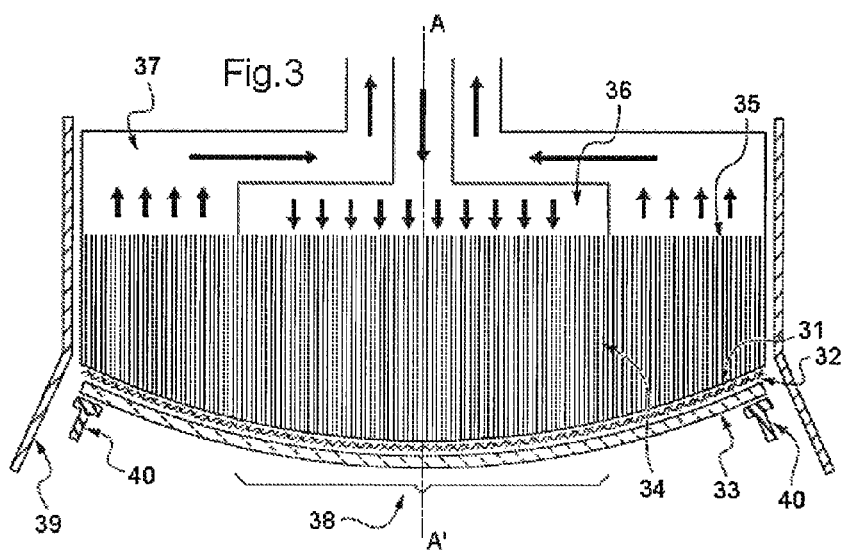
FIG. 3 shows a schematic cross-section of a full bending mold.

FIG. 3 shows schematically the cross section of a "full" bending mold according to the invention seen from the side and compartmentalized in various suction or blowing regions. This mold is called a full mold because it acts on most of the area of the glass pane and especially its central region 38. The bending mold comprises a molding area 31 which is clothed in a fibrous material 32 made of a felt of refractory fibers so as to soften the contact with the glass pane 33. The cells 34 of the bending mold are tubular and the longitudinal direction of these tubes is parallel to the vertical axis AA' and substantially orthogonal to the molding area 31. Two independent regions for providing suction/blow are easily created simply by partitioning the side 35 of the bending mold opposite the bending area 31. The ducts 34 apply a gas pressure (suction or blow) to the molding area 31, which pressure is controlled from the side 35. Thus a central box 36, shown providing blowing (but possibly also providing suction) to the center 38 of the glass 33, and a peripheral box 37, shown providing suction (but possibly also providing blow) to the periphery of the glass, have been created. Also shown is a skirt 39 that may be used to create suction at the periphery of the glass pane. A ring counter-mold 40 for pressing the glass at its periphery has also been shown. The part of the area of the bending mold that lies directly opposite the counter-mold 40 could for example advantageously be exempt from cavities, i.e. 100% solid, so as to prevent any marking. This is because the glass is subjected to the greatest pressure at its periphery since it is compressed between two solid molds. The bending mold could therefore be equipped with a cavity-less metal ring at the periphery only, the area of which would be an integral part of the bending area 31 and which would be a continuation of the part of the bending area provided with cavities.

Figure 4:
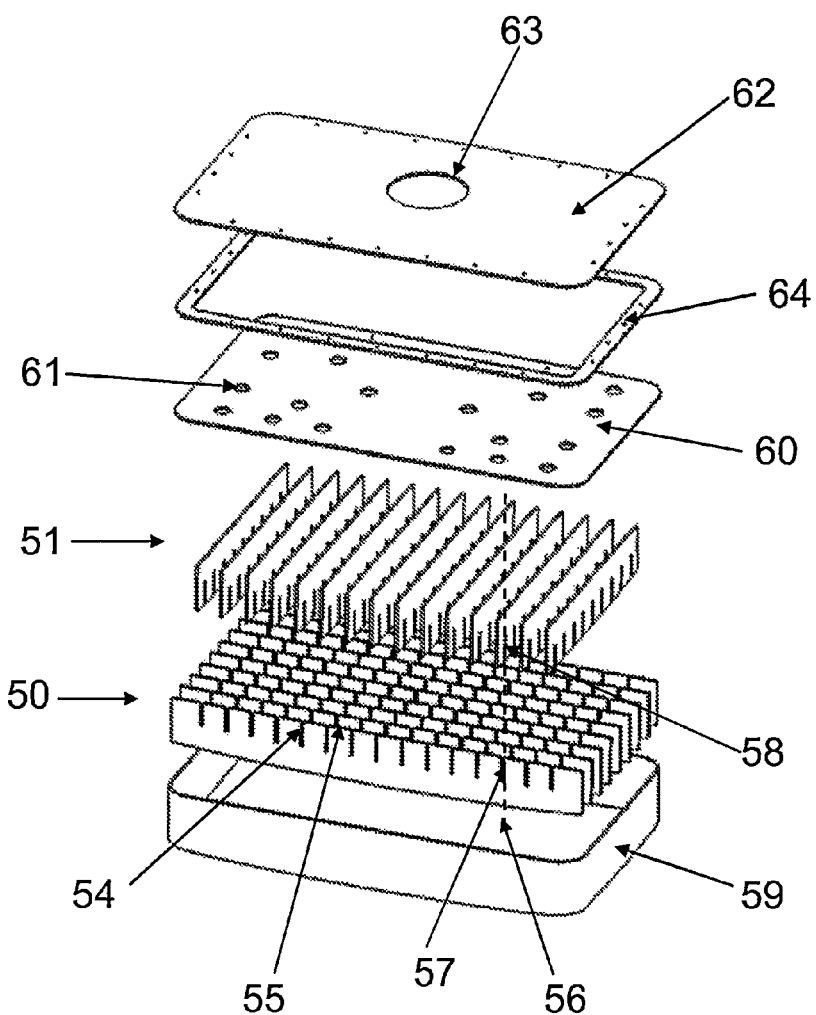
FIG. 4 illustrates an exploded view of the components of another embodiment of a bending mold.

FIG. 4 shows an exploded view of the various parts that make up a bending mold constructed by crossing comb-shaped sheets. Two groups of combs 50 and 51 are slotted together. Each comb is made of a flat plate (or sheet) equipped with a series of notches 54 that are parallel to one another and all cut from the same edge 55 of the plate, perpendicularly to said edge without passing through the entire width of the plate. The thickness of the notch corresponds substantially to the thickness of the plate. Specifically, the notch of one comb of one group is intended to receive a comb of the other group. In each group of combs, all the combs are parallel to one another. The two groups of combs (50, 51) are perpendicular to each other. To slot the combs together, it is possible to proceed as follows: the combs of a first group 50 are placed parallel to one another with their notches 54 facing the same way (upward for the group 50 in FIG. 4). Next, the combs of the second group are, one after the other, fitted into the combs of the first group. The combs slot together via their notch-containing edges. The axes 56 of the notches 57 of the combs of one group 50 and the axes of the notches 58 of the combs of the other group 51 coincide. Once slotted together, the assembly of combs may be welded. The bending area of the bending mold thus contains a multiplicity of cells in the form of a grid. Generally, the assembly is placed inside a metal belt 59. It is possible to apply blowing or suction through the cells of the assembly. The distribution of this pneumatic force may be controlled by placing a distributing sheet 60 into contact with the assembly of combs and opposite the contact area of said mold. This distributing sheet comprises orifices 61 intended to channel the pneumatic (blowing or suction) force to the required places. The pneumatic force arrives at the bending mold via the orifice 63 in a capping sheet 62. A belt 64 acts as an interlayer between the distributing sheet 60 and the capping sheet 62 so as to allow the pneumatic force to be evenly distributed above the distributing sheet and thus supplied equally to all the orifices 61 of the distributing sheet. After the combs have been welded together and the metal belt has been welded to the combs, the bending area may be machined as required to give it the desired bending shape.

Figure 5:
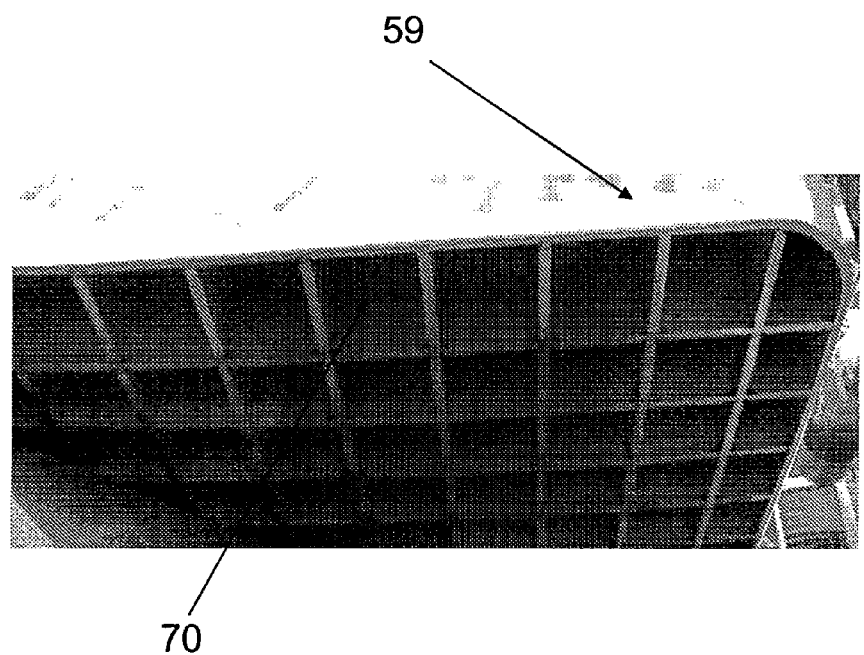
FIG. 5 shows bending area of a bending mold according to FIG. 4.

FIG. 5 shows some of the bending area of a bending mold according to FIG. 4. The belt 59 that bounds the exterior of the bending mold and substantially quadrilateral-shaped cells 70 may be seen, the cells being formed by crossing two groups of combs at right angles to each other.

The invention claimed is:
1. A full mold for bending glass, comprising:
an assembly of metal sheets arranged to form a plurality of cells, the cells forming cavities in a molding area defined by edge faces of the metal sheets, the cells representing more than 40% of a volume of the assembly, the cavities representing more than 40% of the molding area of the assembly; and
a flexible element arranged on the assembly of metal sheets so that a first face of the flexible element directly contacts the edge faces of the metal sheets on the molding area and a second face of the flexible element that is opposite the first face directly contacts a glass pane during a glass bending, the entire flexible element being a gas permeable, woven or nonwoven element that is consisting of refractory fibers.

2. The mold as claimed in claim 1, wherein the assembly is noncompact, the cavities representing more than 70% of the molding area.

3. The mold as claimed in claim 1, wherein the cells represent more than 70% of the volume of the assembly.

4. The mold as claimed in claim 1, wherein the molding area of the assembly represents more than 70% of a total molding area of the mold.

5. The mold as claimed in claim 1, wherein the assembly of metal sheets comprises an alternating assembly of corrugated sheets and flat sheets.

6. The mold as claimed in claim 1, wherein the assembly of metal sheets are spaced from each other such that, within an entirety of the molding area, any portion thereof viewed in an area of a circle of radius greater than 1 cm on the molding area of the assembly contains solid material.

7. The mold as claimed in claim 6, the assembly of metal sheets are spaced from each other such that, within an entirety of the molding area, any portion thereof viewed in an area of a circle of radius greater than 0.5 cm on the molding area of the assembly contains solid material.

8. The mold as claimed in claim 1, wherein a circle of 10 cm radius lying on the molding area and centered on a center of the molding area contains at least 100 cavities.

9. The mold as claimed in claim 1, wherein the cells form ducts passing through the mold in a direction substantially perpendicular to the molding area.

10. A device for bending glass panes comprising:
a bending mold according to claim 9, a side opposite the molding area of the assembly being compartmentalized into a plurality of regions, and an independent box for providing suction or blow being connected to each region so that pressure may be applied to the cells having a form of ducts opening onto the region.

11. The device as claimed in claim 10, further comprising a counter-mold that pressing the glass panes against the bending mold.

12. A process for manufacturing a bending mold of claim 1, comprising:
assembling the metal sheets, which are of different shapes, placed parallel to one another so as to form a cellular unit;
then machining a surface of the molding area of the cellular unit to a bending shape, the molding area located substantially perpendicular to the metal sheets; and
positioning the flexible element to be in direct contact with the edge faces of the metal sheets.

13. The process as claimed in claim 12, wherein the sheets have a thickness ranging from 0.01 to 8 mm.

14. A process for manufacturing a bending mold of claim 1, comprising:
assembling the metal sheets, each sheet having a comb shape and notches that are parallel to one another and cut from a same edge of the respective sheets, the sheets being split into two groups of sheets, the sheets of each group being parallel to one another, and the sheets of a first group being perpendicular to the sheets of a second group, such that the notches of the first group of sheets are filled by the sheets of the second group of sheets; and
positioning the flexible element to be in direct contact with the edge faces of the metal sheets.

15. A process for bending a glass pane at a bending temperature thereof, comprising:
providing a full mold for bending glass, the mold including
an assembly of metal sheets arranged to form a plurality of cells, the cells forming cavities in a molding area defined by edge faces of the metal sheets, the cells representing more than 40% of a volume of the assembly, the cavities representing more than 40% of the molding area of the assembly, and
a flexible element arranged on the assembly of metal sheets so that a first face of the flexible element directly contacts the edge faces of the metal sheets on the molding area, the entire flexible element being a gas permeable, woven or a nonwoven element that is consisting of refractory fibers; and
bending the glass pane against the mold by bringing the glass pane into direct contact with a second face of the flexible element that is opposite the first face of the flexible element.

16. The process as claimed in claim 15, wherein the glass pane does not enter the cavities during the bending.

17. The process as claimed in claim 15, wherein the molding area has at most six changes in concavity and each main face of the final curved glass pane has at most six changes in concavity.

18. The process as claimed in claim 15, wherein the mold is not contained in a furnace.

19. A process for manufacturing a bending mold, comprising:
assembling a plurality of metal sheets, which are of different shapes, placed parallel to one another so as to form a cellular unit;
then machining a surface of a molding area of the cellular unit to a bending shape, the molding area located substantially perpendicular to the metal sheets;
filling the cells with a resin before the machining of the surface of the molding area; and
removing the resin after the machining.

20. A full mold for bending glass, comprising:
a cellular solid material including cells that form cavities in a molding area, the cells representing more than 40% of a volume of the cellular material, the cavities representing more than 40% of the molding area of the cellular material, and the cellular material including an assembly of metal sheets; and
a distributing sheet placed on a side of the cellular material opposite the molding area, the distributing sheet having a plurality of orifices therethrough to direct a pneumatic force of blowing or suction through the cellular material.

21. The mold as claimed in claim 20, wherein the assembly is noncompact, the cavities representing more than 70% of the molding area of the cellular material.

22. The mold as claimed in claim 20, wherein the cells represent more than 70% of the volume of the cellular material.

23. The mold as claimed in claim 20, wherein the molding area of the cellular material represents more than 70% of the total molding area.

24. The mold as claimed in claim 20, wherein the molding area comprises a multiplicity of metal-sheet edge faces.

25. The mold as claimed in claim 20, wherein the assembly of metal sheets comprises an alternating assembly of corrugated sheets and flat sheets.

26. The mold as claimed in claim 20, wherein the assembly of metal sheets are spaced from each other such that, within an entirety of the molding area, any portion thereof viewed in an area of a circle of radius greater than 1 cm on the molding area of the cellular material contains solid material.

27. The mold as claimed in claim 26, the assembly of metal sheets are spaced from each other such that, within an entirety of the molding area, any portion thereof viewed in an area of a circle of radius greater than 0.5 cm on the molding area of the cellular material contains solid material.

28. The mold as claimed in claim 20, wherein a circle of 10 cm radius lying on the molding area and centered on a center of the molding area contains at least 100 cavities.

29. The mold as claimed in claim 20, wherein the cells form ducts passing through the mold in a direction substantially perpendicular to the molding area.

30. A device for bending glass panes comprising:
a bending mold according to claim 29, a side opposite the molding area of the cellular material being compartmentalized into a plurality of regions, and an independent box for providing suction or blow being connected to each region so that pressure may be applied to the cells having a form of ducts opening onto the region.

31. A process for bending a glass pane at a bending temperature thereof, comprising:
providing a full mold for bending glass, the mold including
a cellular solid material including cells that form cavities in a molding area, the cells representing more than 40% of a volume of the cellular material, the cavities representing more than 40% of the molding area of the cellular material, and the cellular material including an assembly of metal sheets, and
a distributing sheet placed on a side of the cellular material opposite the molding area, the distributing sheet having a plurality of orifices therethrough to direct a pneumatic force of blowing or suction through the cellular material;
placing a woven or a nonwoven element having refractory fibers in an intermediate position between the glass pane and the molding area; and
bending the glass pane against the mold.

32. The process as claimed in claim 31, wherein the glass pane does not enter the cavities during the bending.

33. The process as claimed in claim 31, wherein the molding area has at most six changes in concavity and each main face of the final curved glass pane has at most six changes in concavity.

34. The process as claimed in claim 31, wherein the mold is not contained in a furnace.

* * * * *